United States Patent [19]

McNeill

[11] Patent Number: 4,603,871
[45] Date of Patent: Aug. 5, 1986

[54] WHEEL FOR SHOPPING CART OR THE LIKE

[75] Inventor: Samuel J. McNeill, Redondo Beach, Calif.

[73] Assignee: Fred N. Schwend, Mira Loma, Calif.; a part interest

[21] Appl. No.: 760,758

[22] Filed: Jul. 26, 1985

Related U.S. Application Data

[63] Continuation-in-part of Ser. No. 740,756, Jun. 3, 1985, abandoned.

[51] Int. Cl.⁴ ............................................. B62B 39/00
[52] U.S. Cl. ............................. 280/33.99 C; 188/1.12; 301/6 R
[58] Field of Search ................. 280/33.99 R, 33.99 A, 280/33.99 C, DIG. 4; 16/35 R, 45–48, 107, DIG. 8, DIG. 21; 188/1.12, 268, 174; 301/5 R, 6 R, 6 WB; 152/317, 336.1, 518, 520

[56] References Cited

U.S. PATENT DOCUMENTS

| | | | |
|---|---|---|---|
| 1,426,902 | 8/1922 | Noel et al. | 180/305 |
| 3,376,954 | 4/1968 | Neptune | 280/33.99 C |
| 3,500,965 | 3/1970 | Nossokoff et al. | 280/33.99 C |

Primary Examiner—John J. Love
Assistant Examiner—Richard M. Camby
Attorney, Agent, or Firm—Fred N. Schwend

[57] ABSTRACT

A shopping cart or the like having supporting wheels, each having at least one annular cavity concentric with the axis of rotation of the respective wheel. The cavity is partly filled with weighted balls, and projections extend into the cavity for engagement with the balls to restrain free movement of the cart from a parked condition.

12 Claims, 5 Drawing Figures

WHEEL FOR SHOPPING CART OR THE LIKE

BACKGROUND OF THE INVENTION

This is a continuation-in-part application based on my pending patent application, Ser. No. 06/740,756, filed on June 3, 1985.

1. Field of the Invention

This invention relates to shopping carts or the like and has particular reference to means for restraining free rolling of such carts, such as when parked on a slope.

2. Description of the Prior Art

For many years stores, such as grocery stores, department stores, hardware stores, etc., have, for the convenience of their customers, provided shopping carts in which the customer can carry purchased merchandise throughout the store and from the store to a parked car. In many cases, the car parking areas are located on sloping ground for the purpose of water drainage or merely to follow the ground contour on which the parking area is situated.

Such shopping carts are generally mounted on free rolling wheels, certain or all of which may swivel to facilitate manipulating the cart. Although such carts are easy to control, they tend to roll freely in an uncontrolled manner down any incline when not otherwise restrained. This is particularly aggravating when the customer parks the cart and is transferring merchandise from the cart to his or her car, at which time the cart is unrestrained and free to move.

Accordingly, a dangerous situation can develop since the cart may freely roll into other cars, structures, or persons in the parking area, resulting in damage to property and injuries to persons.

SUMMARY OF THE INVENTION

A principal object of the present invention is to provide a simple and inexpensive means for restraining free rolling of a shopping cart or the like down an incline after being parked on such incline.

Another object is to restrain a shopping cart or the like from rolling down an incline of a normally encountered slope while permitting the cart to be easily moved about once it is started in motion.

Another object is to readily modify existing wheels of a shopping cart or the like to restrain free rolling movement of the wheels.

According to the present invention, at least one of the wheels of a shopping cart or the like is provided with an annular cavity surrounding the wheel bearing. The cavity is partly filled with weight elements, such as small metal spheres, which, under the influence of gravity, move to the bottom of the cavity when the cart is at rest. Projections spaced around the wheel, extend into the cavity adjacent the portion thereof remote from the bearing and thus, at least certain of the projections engage some of the elements. Therefore, if the cart is parked on an incline, the elements combine and co-act with the projections to form an offcenter weight which restrains free rolling movement of the cart. However, once the cart is set in motion, the elements will tumble or flow over each other, tending to maintain their positions toward the lowest point in the wheel cavity. This will induce a small amount of drag. However, as the speed of the cart is increased, the elements tend to distribute themselves more equally around the interior of the cavity and are held against the outer portion of the cavity by centrifugal force so that the aforementioned restraining effect is substantially eliminated.

By coating the weight elements and at least a part of the interior surface of the cavity with sound absorbing material, any noise generated by tumbling of the weight elements is greatly reduced.

BRIEF DESCRIPTION OF THE DRAWINGS

The manner in which the above and other objects of the invention are accomplished will be readily understood on reference to the following specifications when read in conjunction with the accompanying drawing, wherein.

DESCRIPTION OF THE PREFERRED EMBODIMENT

Figure 1:
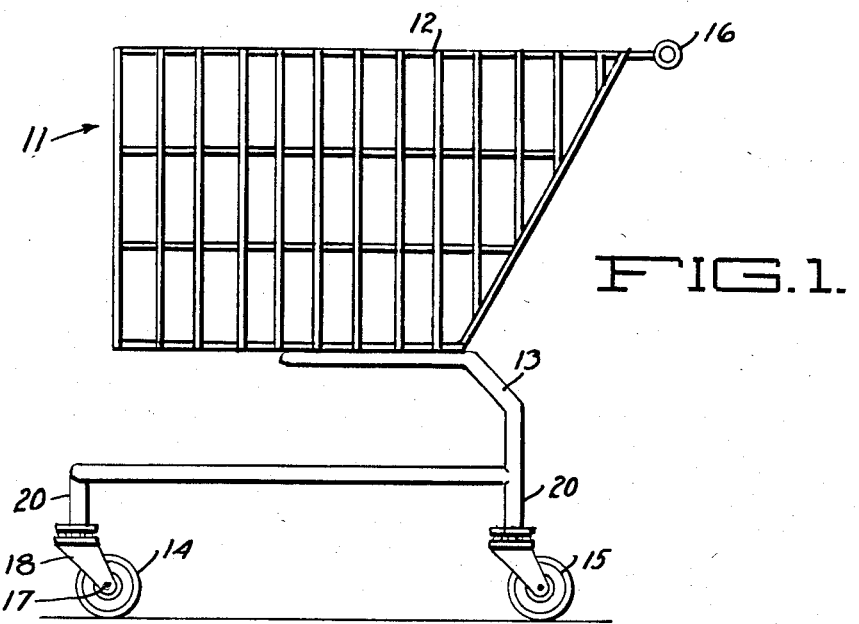
FIG. 1 is a side view of a typical shopping cart embodying a preferred form of the present invention.

While this invention is susceptible to embodiment in many different forms, there is shown in the drawings and will be described in detail one specific embodiment and one modified embodiment, with the understanding that the present disclosure is to be considered as an exemplification of the principles of the invention and is not intended to limit the invention to the embodiments illustrated. The scope of the invention will be pointed out in the appended claims.

Referring particularly now to FIG. 1, a typical shopping cart is depicted comprising a body, generally indicated at 11, formed by a wire basket 12 mounted on a tubular supporting frame 13 which, in turn, is mounted on a pair of front wheels, one of which is shown at 14, and a pair of rear wheels, one of which is shown at 15. A handle 16 is suitably attached to the rear of the basket 12 to facilitate pushing or pulling or otherwise manipulating the cart as desired.

The front and rear wheels 14 and 15, respectively, are similar in construction and each comprises an axial bearing sleeve 16 (FIG. 2 and 3) which is secured against rotation, as by frictional engagement on a shaft 17 secured, as by frictional engagement, between spaced arms of a u-shaped fork 18 mounted for swiveling movement on a depending leg 20 of the frame 13.

The sleeve 16 supports the inner races of a pair of spaced ball bearings 21 and 22, the outer races of which rotatably support the hub 23 of a wheel flange 24. The latter has a wheel rim 25 formed thereon, on which is mounted a tire 26 of rubber.

Circular dust covers 27 and 28 are secured against rotation over the opposite ends of the bearing sleeve 16 as by frictional engagement, to cover the bearings 21 and 22, respectively. Conical flanges 29 are formed on the outer peripheries of the dust covers which extend over the respective ends of the wheel hub 23.

Annular discs 31 and 32 are secured, as by a suitable adhesive, to the opposite edges of the wheel rim 25, and central openings 33 therein lie closely adjacent the conical flanges 29 of the dust covers 27 and 28.

Together, the wheel flange 24 and discs 31 and 32 form a pair of annular cavities 35 and 36 which extend concentrically about the bearing sleeve 16.

Paddle shaped projections 37 are formed on each of the discs 31 and 32 to extend into the respective cavities 35 and 36. Such projections are equi-spaced around the cavities and are located directly adjacent the rim 25. Each projection extends radially inwardly approximately one half the radial distance between the outer diameter of the wheel hub 23 and the inner diameter of the wheel rim 25.

The cavities 35 and 36 are each filled approximately one half full with small metal balls or spheres 38, preferably formed of lead or other relatively heavy material.

Figure 2:
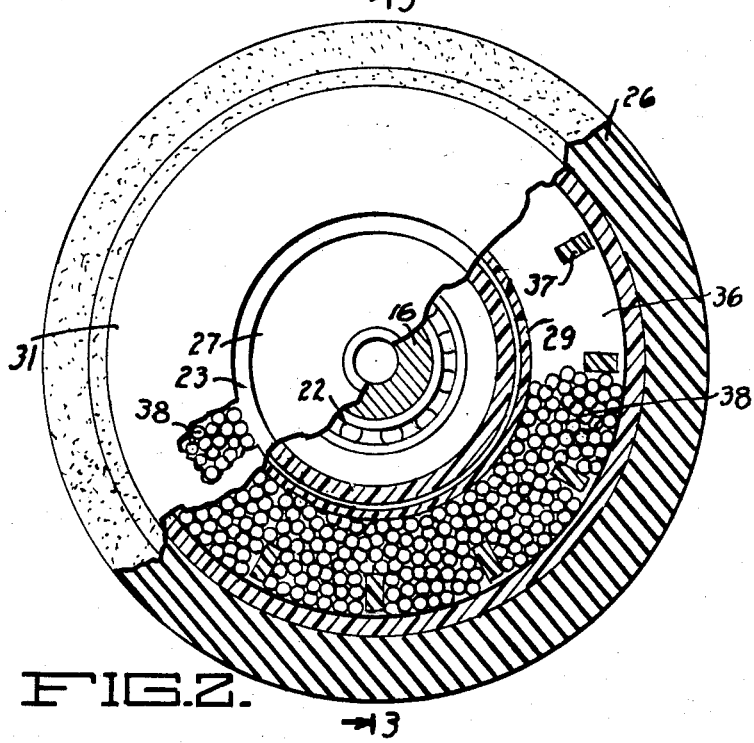
FIG. 2 is an enlarged side view, partly in section, of one of the cart wheels and is taken substantially along line 2—2 of FIG. 3.
Figure 3:
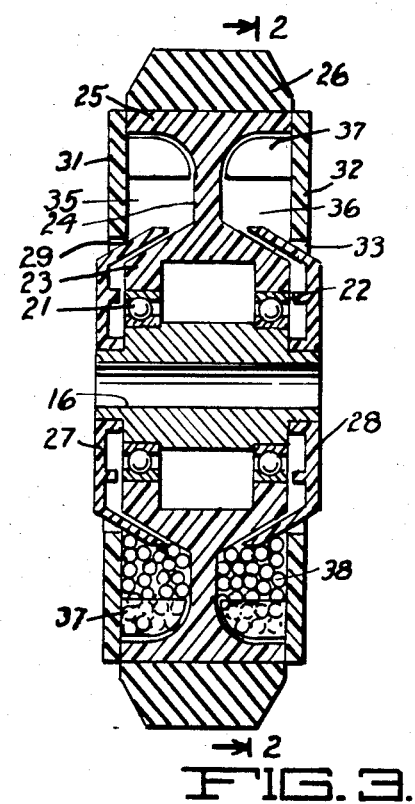
FIG. 3 is a transverse sectional view taken along line 3—3 of FIG. 2.

Normally, when the cart 11 and wheels 14 and 15 are at rest, the balls 38 lie in the lower half of each of the cavities 35 and 36 as depicted in FIGS. 2 and 3 where they rest against the lower projections 37. The balls 38 together thus form an offcenter depending weight arm which opposes any rolling movement of the wheel in either direction. Also, the balls frictionally engage the stationary dust covers 27 and 28 to resist movement of the balls as the wheel rotates. Thus, the balls restrain free movement of the cart even though it may be parked on an inclined surface.

If desired, the flanges 29 may be extended laterally to extend over a greater area of the wheel hub 23 than is shown in FIG. 3. This will effect a greater frictional engagement between the dust cover and the balls.

However, if the cart is pushed or pulled from its rest position, the wheels will roll and the projection 37 will tend to carry the balls 38 around with them. During such rolling movement, the balls 38 will be acted upon by gravity and will tumble or flow over each other while attempting to remain in the lowermost portions of the respective cavities. As the speed of the cart is increased, the projections 37 will tend to distribute the balls more evenly around their respective cavities and the centrifugal forces developed by rotation of the wheels will maintain the balls adjacent the outer portions of the cavities. Therefore, any drag or resistance to rolling of the wheels will be reduced to a minimum. Also, any noise otherwise created by the balls 38 tumbling over each other will be eliminated.

Figures 4, 5:
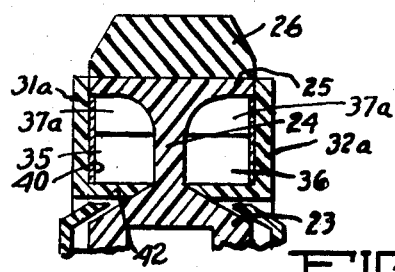
FIG. 4 is a sectional view, similar to FIG. 3, but partly broken away, showing a modified form of the invention.
FIG. 5 is a side view, partly in section, of one of the weight balls.

FIG. 5 illustrates a layer or coating 39 of sound absorbing material, such as plastic or rubber, which may be applied over the surface of each of the balls 38 to reduce any noise created by the balls as they tumble over each other.

Although I have found it preferrable to use balls as the weight elements, gravel or other relatively heavy flowable material could likewise be used.

DESCRIPTION OF THE ALTERNATE EMBODIMENT

FIG. 4 illustrates an alternate embodiment of the invention. Herein, elements similar to the elements shown in FIGS. 2 and 3 will be represented by similar reference characters.

In this case, projections 37a, somewhat similar to projections 37, are formed on opposite sides of the wheel flange 24 and lie adjacent the discs 31a and 32a. Inwardly extending annular flanges 42 on the discs bear against the hub 23 to completely close the cavities 35 and 36. Also, a layer or coating 40 of sound absorbing material, such as plastic or rubber, is applied to the interior surfaces of the discs 30 and 31 to absorb any noise created by the balls as they tumble over each other.

Although the invention is particularly applicable to shopping carts, it may also be embodied in wheels for similar carts, such as luggage carts, warehouse carts, baby buggies, etc.

I claim:

1. A wheel for restraining free rolling movement of a shopping cart or the like from a parked position, said wheel comprising
bearing means for mounting said wheel on said cart or the like for rotation about an axis,
means on said wheel forming a cavity surrounding said bearing means,
said cavity extending concentrically about said axis,
flowable weighting material in said cavity,
said material being effective to flow under the influence of gravity to the bottom of said cavity,
said material only partially filling said cavity, and
projections on said wheel extending into said cavity and into the path of movement of said material whereby to restrain rolling movement of said wheel.

2. A wheel as defined in claim 1 wherein said weighting material comprises a plurality of weighting elements.

3. A wheel as defined in claim 2 wherein said weighting elements comprise roller elements.

4. A wheel as defined in claim 2 wherein said weighting elements comprise spheres.

5. A wheel as defined in claim 4 wherein said spheres fill approximately one half of said cavity.

6. A wheel as defined in claim 4 wherein each of said spheres comprises an outer coating of sound absorbing material.

7. A wheel as defined in claim 4 wherein said cavity forming means comprises a coating of sound absorbing material.

8. A wheel as defined in claim 3 wherein said projections are evenly spaced around said bearing means.

9. A wheel as defined in claim 3 wherein said projections extend into a portion of said cavity remote from said bearing means.

10. A wheel as defined in claim 1 comprising
restraining means extending into said cavity and into frictional engagement with said material, and
means for preventing rotation of said restraining means about said axis by said material.

11. A shopping cart or the like comprising
a cart body,
a plurality of wheels supporting said body for movement over a ground surface,
at least one of said wheels comprising bearing means for rotatably mounting said wheel,
means on said wheel forming a cavity extending annularly about the axis of rotation of said bearing means,
a plurality of weighting spheres in said cavity,
said spheres only partly filling said cavity and being effective to move under the influence of gravity to the bottom of said cavity, and
projections on said wheel extending into said cavity,
said projections being spaced about said axis and extending into a portion of said cavity remote from said bearing means.

12. A shopping cart or the like as defined in claim 11 comprising coating of sound absorbing material surrounding each of said spheres and at least a part of said cavity.

* * * * *